March 10, 1970  U. STROLE ET AL  3,499,470
MULTILAYER LATERALLY EXPANSIBLE TUBE OF THERMOPLASTIC MATERIAL
Filed Dec. 27, 1967
FIG. 1
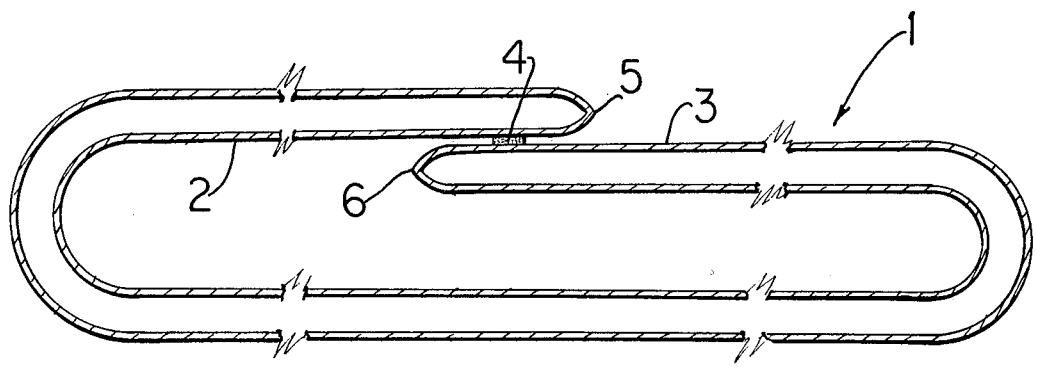
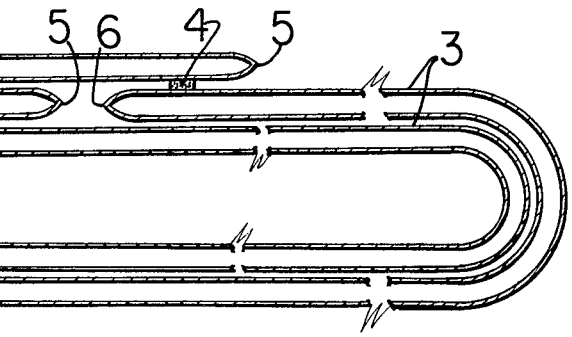
FIG. 2
INVENTORS
ULRICH STROLE
RUDOLF KLEIN
BY WALTER WEIDINGER
ATTORNEYS

United States Patent Office 3,499,470
Patented Mar. 10, 1970

3,499,470
MULTILAYER LATERALLY EXPANSIBLE TUBE OF THERMOPLASTIC MATERIAL
Ulrich Strole, Leutershausen, Rudolf Klein, Mutterstadt, and Walter Weidinger, Mannheim-Kafertal, Germany, assignors to Zellstoffabrik Waldhof, Mannheim-Waldhof, Germany, a corporation of Germany
Filed Dec. 27, 1967, Ser. No. 693,876
Claims priority, application Germany, Dec. 31, 1966, Z 12,624
Int. Cl. F16l 11/06, 11/12
U.S. Cl. 138—170    3 Claims

ABSTRACT OF THE DISCLOSURE

This invention relates to a multilayer tube of thermoplastic material adapted for the manufacture of multilayer bags consisting of a cylindrical tube with two overlapping edges formed from a flat, thin tube whereby said two overlapping edges have four layers of thermoplastic material, and a longitudinal seam connecting the inner two layers of said overlapping edges, said two overlapping edges extending beyond said longitudinal seam. The invention also relates to bags or sacks formed from said multilayer tube, which bags or sacks have a certain degree of cross-sectional expansion and resist excessive lateral internal pressures.

CLAIM OF PRIORITY

Under the provisions of 35 USC 119, the benefit of priority is hereby claimed based on the corresponding German patent application Z 12,624 VIIb/81c, filed Dec. 31, 1966, on our behalf.

THE PRIOR ART

Multilayer plastic sacks are known as such, as are those made from tubes. For example, two flat tubes have been superposed in a flat fashion and bonded together at both edges. As a rule, this bonding was effected by means of a tape enclosing the edges. But these plastic sacks have not proved satisfactory because with insufficiently extensive bonding, the joint of the edges of the two tubes at the tape formed the weakest point and the sack was apt to be damaged. Moreover, in the case where the bonding was effected in a continuous manner, that is to say, that also the inner sides of the tubes were bonded together, the sack produced from the tubes had projecting margins, which were a hindrance in stacking the sacks. Also, it was noted that the outer layer did not contribute in the stacked condition to the improvement of the stability, as it was desired to be achieved in these multilayer sacks.

In another embodiment form, the multilayer was produced in that a tube was cut open, several such ribbons were placed one upon the other to obtain a flat ribbon, and the ribbon was again formed into a tube and the edges were bonded either in an abutting or overlapping manner. However, this method requires several additional working steps due to the cutting of the tubes produced by gas pressure extrusion and the superposing of the flat tube thus obtained.

OBJECTS OF THE INVENTION

An object of the invention is to produce a multilayer sack or bag of thermoplastic material which, in addition, should display an improved flexibility.

Another object of the invention is the obtaining of a multilayer tube of thermoplastic material adapted for the manufacture of multilayer bags consisting of a cylindrical tube with two overlapping edges formed from a flat, thin foil tube whereby said two overlapping edges have four layers of thermoplastic material, and a longitudinal seam connecting the inner two layers of said overlapping edges, said two overlapping edges extending beyond said longitudinal seam.

A further object of the invention is the obtaining of a multilayer tube of thermoplastic material which will resist excessive lateral internal pressures.

These and other objects of the invention will become more apparent as the description thereof proceeds.

DESCRIPTION OF THE INVENTION

These objects were fulfilled by means of a multilayer tube of thermoplastic material adapted to form bags or sacks with the characteristic that said multilayer tube is formed from a flat tube. The longitudinal seam is formed so that the overlapping ends extend slightly from the seam at both sides, thereby only the internal parts of the tube are fastened together. More particularly, the invention resides in a multilayer tube of thermoplastic material adapted for the manufacture of multilayer bags consisting of a cylindrical tube with two overlapping edges formed from a flat, thin tube whereby said two overlapping edges have four layers of thermoplastic material, and a longitudinal seam connecting the inner two layers of said overlapping edges, said two overlapping edges extending beyond said longitudinal seam.

In the drawings, FIGURE 1 is a cross-sectional view of the multilayer tube of thermoplastic material adapted for the manufacture of multilayer bags and FIGURE 2 is a cross-sectional view of two multilayer tubes fitted into one another.

The multilayer tube of thermoplastic material of the invention, formed from a flat tube, is very simply produced. It can be processed in one single operational step directly following the forming and flattening of the tube. Consequently, this process does not require any intermediate step of rolling up the flattened tube. Another advantage can be seen in that an excellent flexibility is displayed by the tube of the invention and the sacks or bags produced therefrom.

Due to the fact that the longitudinal seam is applied in the immediate area of the edges of the flat tube, the elastic forces, inherent in every plastic material, allow a certain resilience of the edges, which resiliency is still more favorable in that only the immediately internally superposed parts of the overlapping edges are fastened together. At an increased lateral internal pressure, these resilient edges of the multilayer tube have sufficiently free play that the diameter of the sack can be enlarged. The wall of a sack made from the multilayer tube can, therefore, yield and thus absorb an impact or pressure in a more elastic manner. In particular, this advantage is most effective with plastic sacks, which are provided with a bottom in the form of a block bag bottom. Due to the resilience of the side walls due to the longitudinal seam applied according to the invention, it has been furthermore discovered that the sack or bag can be produced from an essentially thinner walled material, than it was possible until now. By this means, the so-called layer effect is still more increased. For example, a bi-layered sack, whose walls are only half as thick, can endure more usage than a single layer sack with identical overall wall thickness.

Depending on the respective gauge of the tube and on the resiliency of the plastic material, the longitudinal seam is applied between the overlapping edges of the flat tube in such a manner that the tube edges extend at least about 5 mm., preferably 10 or more millimeters, beyond the seam. An additional criterion for the positioning of the longitudinal seam is the resiliency desired in the sack produced by the multilayer tube.

Preferably the flat, thin tube utilized as a starting material is formed by the gas pressure method of extrusion through an annular die nozzle. The materials utilized are those thermoplastic synthetics which can be processed according to the gas pressure method. Particularly preferable are the polyolefins, such as polyethylene and polypropylene, or the chlorinated polyvinyl compounds, such as polyvinyl chloride and polyvinylidine chloride, or mixed polymerizates of the above or mixtures of the above polymerizates. Other thermoplastic synthetics such as polyamides, polystyrene and mixed polymerizates with acryl compounds can also be utilized.

The gauge of the flat, thin tube used as a starting material can vary over wide limits. However, it is preferable to utilize tubes with a gauge, or wall thickness as thin as practicable. Preferably the gauge of the tube should be between $50\mu$ and $200\mu$. The flat width of the tube can be as wide as desired within the possibilities of the gas pressure extrusion method.

As indicated, the flattened thin tube is processed through a tube forming device to form a tube with overlapping edges. It is preferable that the two edges overlap from about 2% to about 10% of the flattened width of the tube with overlapping edges. For example, a flattened tube with a gauge of $100\mu$ and a flattened width of 113 cm. is formed into a tube with a flattened width of 55 cm. and with 3 cm. of overlapping edges, or about 5.5% of the flattened width, of the tube with overlapping edges.

To produce the longitudinal seam, an adhesive is applied between the superimposed edges of the tube between the inner layers. However, according to a particularly preferred method, the seam can be obtained by means of a thermoplastic fiber or strip, which is inserted while still warm, between the overlapping edges and is securely fixed by external pressure. Here, it must be observed that the temperature of the thermoplastic fiber should be adjusted that merely a bonding of the layers coming in direct contact with this fiber is effected, while the superimposed external edges of the tube is not bonded with the internal layer.

In addition to the two layer tube described from which sacks or bags can be produced, multilayer sacks or bags can be produced, their walls having four, six, eight or more layers of material. For this purpose, several tubes, provided with the longitudinal seam of the invention, are fitted into one another and used to produce the multi-walled sacks or bags.

The enclosed drawing illustrates two forms of construction for the multilayer tube adapted for the manufacture of sacks or bags of the invention.

FIG. 1 shows a cross-sectional view of a multilayer tube.

FIG. 2 shows the cross-sectional view of two multilayer tubes fitted into one another, each provided with the seam according to the invention.

Referring to FIG. 1, it can be seen that a flat tube is formed into a two-layer tube 1 with an overlapping seam. The surfaces 2 and 3 of the tube, superposed in the overlapping seam, are glued or bonded together with the aid of an adhesive or a plastic fiber 4. With an internal lateral pressure, the edges 5 and 6 of the plastic tube, extending beyond the point of the seam, will yield sufficiently to elastically absorb the pressure.

FIG. 2 shows likewise a cross-sectional view through a four-layer plastic sack, two tubes being fitted into one another according to FIG. 1.

The sacks or bags formed from the multilayer tubes of the invention may be formed as open flat sacks, as sacks with lateral pleats, or with a bottom.

The following example will serve to illustrate in detail the usual process for the production of the multilayer tube according to the invention.

Example

From a gas-pressure extruder a tube of polyethylene was extruded, having a thickness of $100\mu$ and a flat width of 113 cm., and flattened. Without cutting its edges, this flat tube was inserted into a tube machine and formed in longitudinal direction into a two-layer tube with a flat width of 55 cm. The edges overlapped 3 cm. As adhesive a so-called two-component adhesive was used, prepared with various solvents. The adhesive solution was applied in an approximately 1 cm. wide strip, about 1 cm. from both edges of the flat tube in such a manner that when the edges overlapped, the adhesive was on the inner layers of the flat tube in contact. The solvent used was evaporated by blowing hot air prior to the formation of the seam. After the overlapping ends of the strips had been brought together, the seam was pressed by means of cylinders or rollers to secure a perfect bonding of the strip of adhesive.

In the subsequent activity of the machine, individual tube sections were separated from the tube ribbon and these were stacked for storage.

Bags or sacks were made from these individual tube sections by conventional processes. An individual two layer tube section could also be inserted in another two layer tube section to give a 4-layer or 6-layer or 8-layer tube section for the manufacture of bags or sacks.

The preceding specific embodiment is illustrative of the practice of the invention. It is to be understood, however, that other expedients known to those skilled in the art can be employed without departing from the spirit of the invention.

We claim:
1. A multilayer tube of thermoplastic material adapted for the manufacture of multilayer bags consisting of a cylindrical tube flattened across the diameter to present first and second end portions, said end portions brought together in overlapping relationship to form said multilayer tube, said two overlapping portions having four layers of thermoplastic material, and a longitudinal seam connecting the contacting layers of said overlapping portions, said two overlapping edge portions extending beyond said longitudinal seam.

2. The multilayer tube of claim 1 wherein said two overlapping portions extend at least 5 mm. beyond said longitudinal seam.

3. The multilayer tube of claim 1 wherein said two overlapping portions extend at least 10 mm. beyond said longitudinal seam.

References Cited

UNITED STATES PATENTS

| 165,159 | 7/1875 | Downing | 138—128 |
| 168,367 | 10/1875 | Boies | 138—128 |
| 2,148,884 | 2/1939 | Walter | 138—128 |
| 2,380,427 | 7/1945 | Gilfillan | 138—170 |
| 2,679,968 | 6/1954 | Richter | 138—128 |
| 3,088,495 | 5/1963 | Svec | 138—128 |

HERBERT F. ROSS, Primary Examiner

U.S. Cl. X.R.

138—128, 156